July 2, 1963
E. S. KARASINSKI
3,096,049
STEERING MEANS FOR SPACE VEHICLES MISSILES
AND HIGH ALTITUDE FLYING CRAFT
Filed Jan. 25, 1960
5 Sheets-Sheet 1
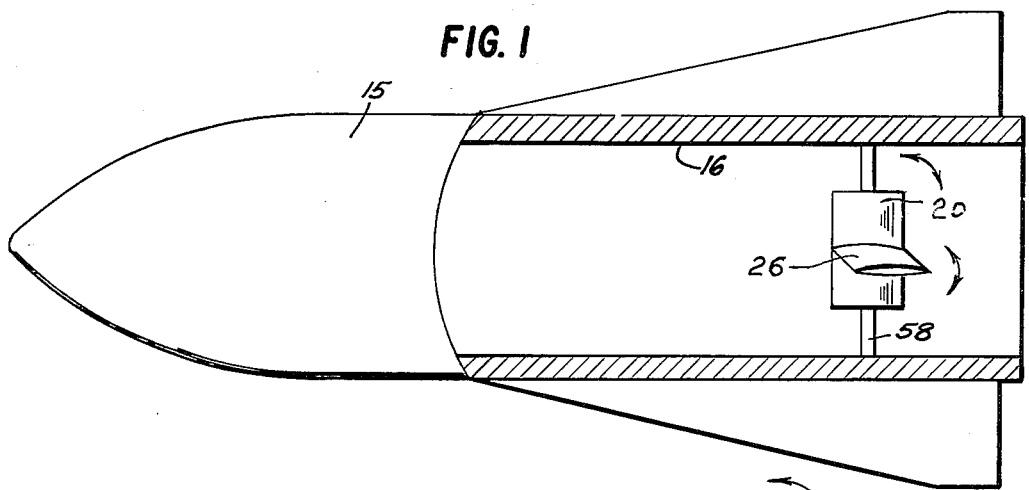
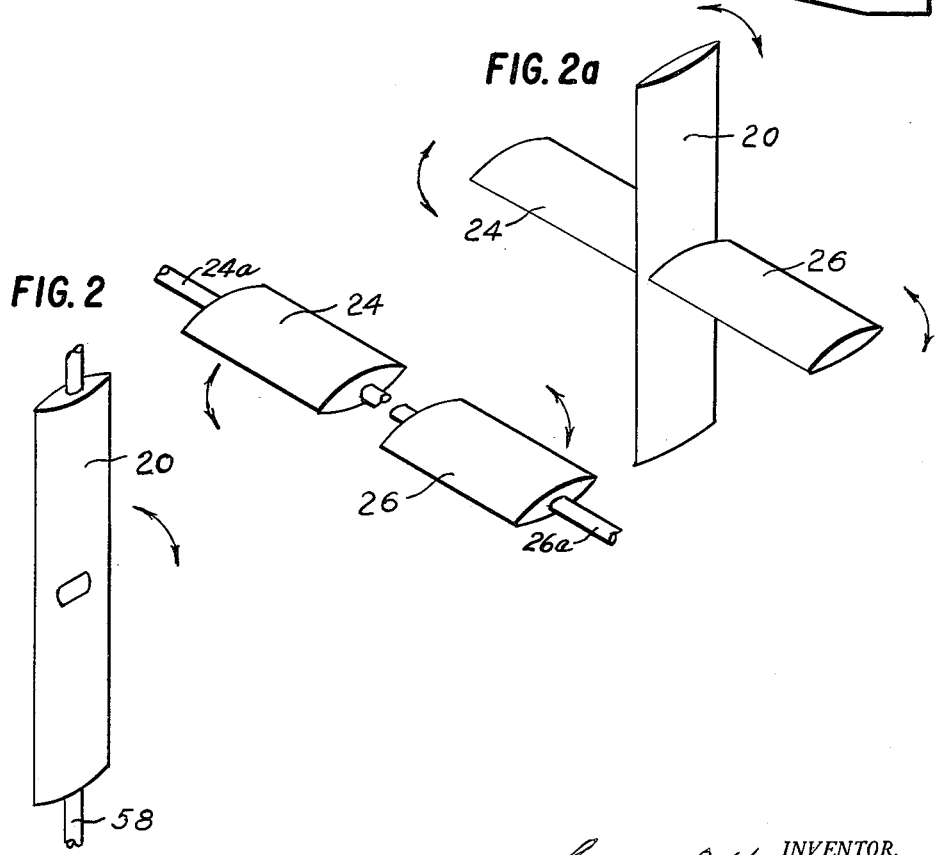
INVENTOR.
Edward S. Karasinski July 2, 1963  E. S. KARASINSKI  3,096,049
STEERING MEANS FOR SPACE VEHICLES MISSILES
AND HIGH ALTITUDE FLYING CRAFT
Filed Jan. 25, 1960  5 Sheets-Sheet 2
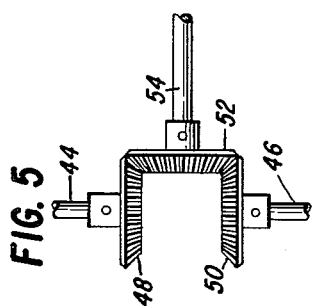
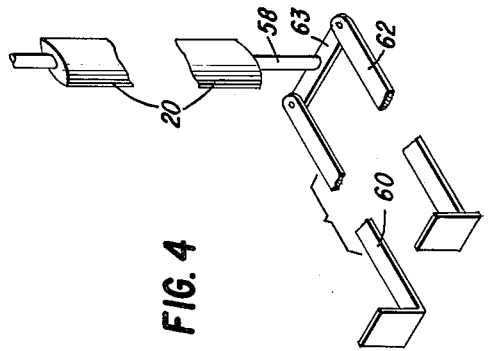
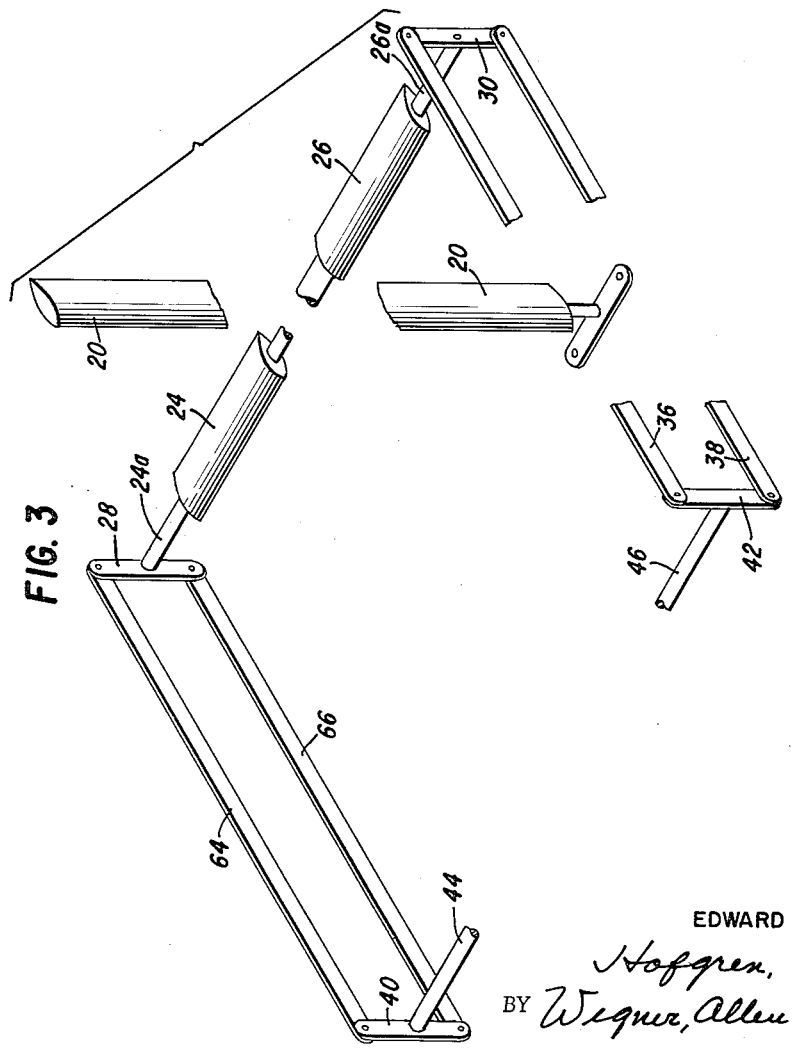
INVENTOR
EDWARD S. KARASINSKI
BY Hofgren, Brady,
Wegner, Allen & Stellman
ATTORNEYS July 2, 1963 E. S. KARASINSKI 3,096,049
STEERING MEANS FOR SPACE VEHICLES MISSILES
AND HIGH ALTITUDE FLYING CRAFT
Filed Jan. 25, 1960 5 Sheets-Sheet 3

INVENTOR
Edward S. Karasinski
BY

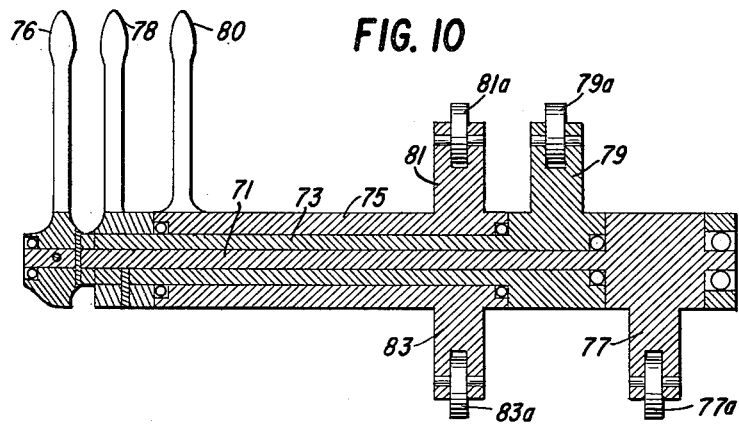
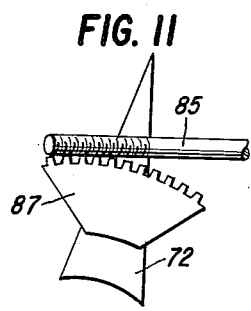
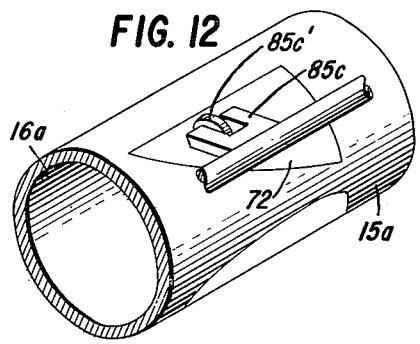
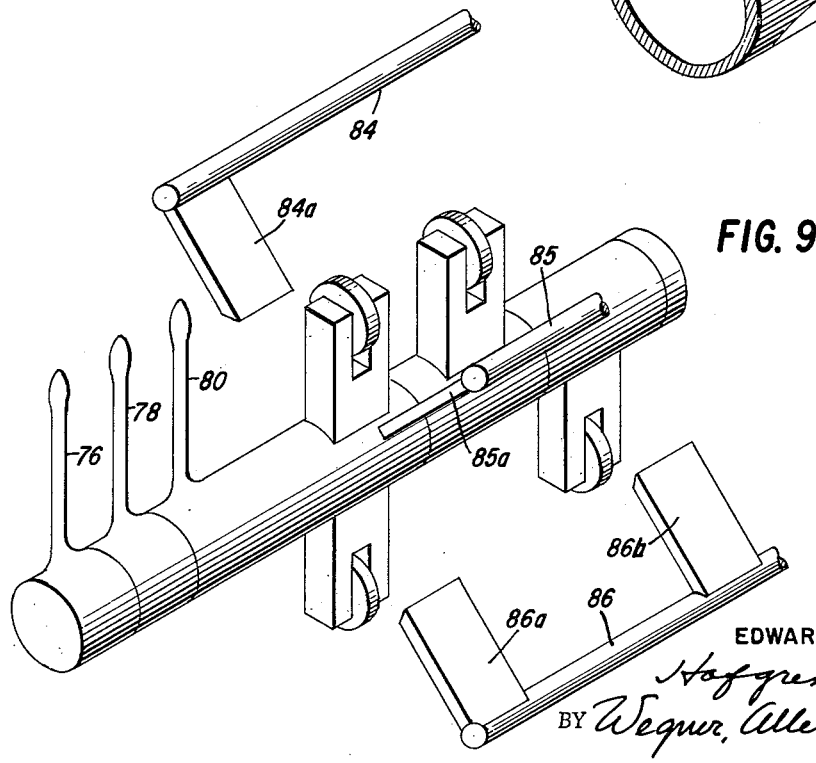

July 2, 1963     E. S. KARASINSKI     3,096,049
STEERING MEANS FOR SPACE VEHICLES MISSILES
AND HIGH ALTITUDE FLYING CRAFT
Filed Jan. 25, 1960     5 Sheets-Sheet 5
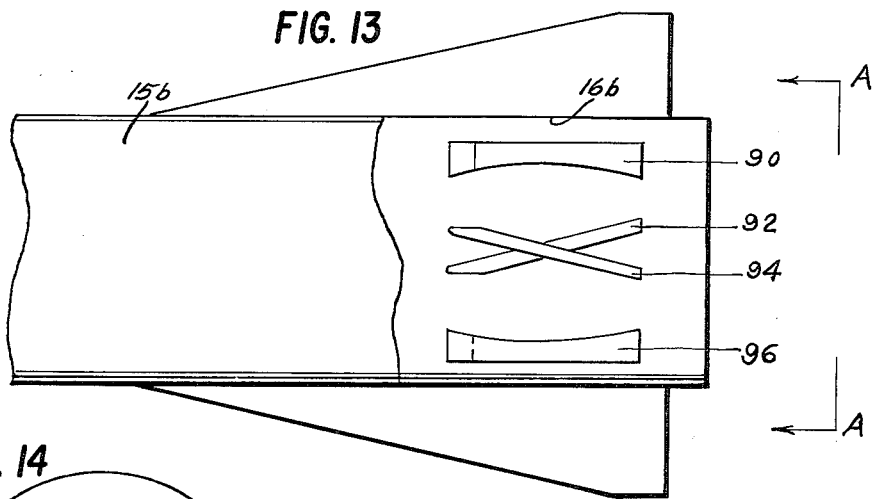
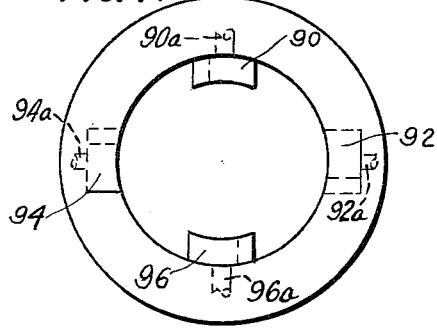
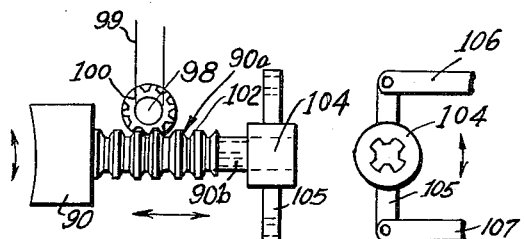
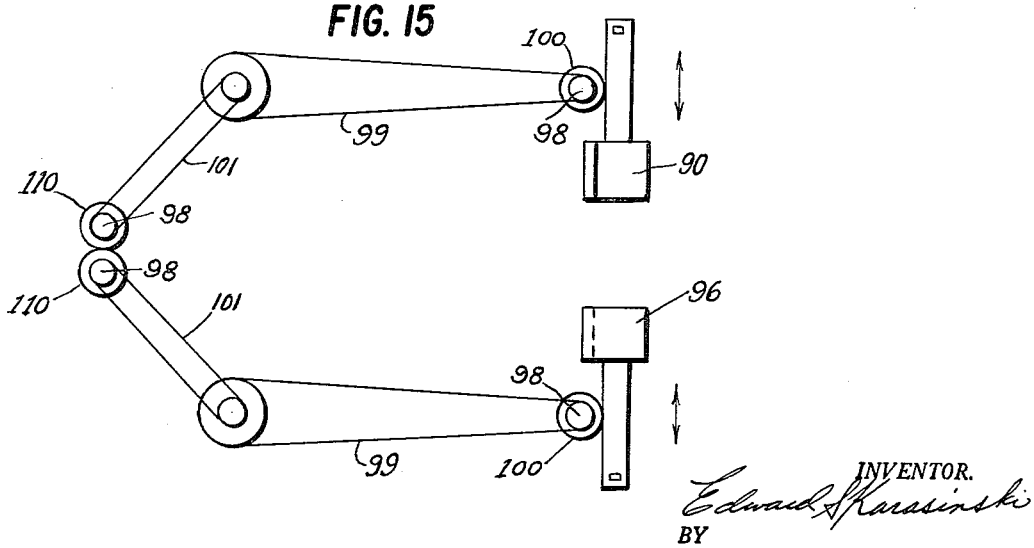
INVENTOR.
Edward S. Karasinski
BY

United States Patent Office 3,096,049
Patented July 2, 1963

3,096,049
STEERING MEANS FOR SPACE VEHICLES MISSILES AND HIGH ALTITUDE FLYING CRAFT
Edward S. Karasinski, 2605 Ridgeway Ave., Chicago, Ill.
Filed Jan. 25, 1960, Ser. No. 4,535
5 Claims. (Cl. 244—52)

This invention is concerned with a mechanism for steering space vehicles, missiles or high altitude craft. The invention eliminates the need for complicated auxiliary rockets for steering.

An object of the invention is the provision of exhaust deflecting blades or members provided in the exhaust stream and using expended gases to revolve and turn a vehicle in space where there is no air to steer the vehicle. Deflection is obtained by the force of expended gases passing gas deflecting members or blades in the exhaust stream.

In this invention, controllable deflecting blades may comprise blades on vertical and horizontal axes in the same vertical plane as shown or longitudinally spaced of the craft on horizontal and vertical axes in separate planes (not shown). The blades may be suitably located in the exhaust stream in either case.

The invention includes a mechanism to turn the gas deflecting blades alternately or simultaneously and in a synchronous manner, on their respective axes, to effect turning or revolving of the space vehicle. A means is provided to swivel the blades on their axes, simultaneously and in the same plane, for tilting the space vehicle.

The blades may be mechanically operated by connecting rods as shown or by sprockets and chains or other suitable linkage means, which may be motor driven, hydraulically or manually actuated or operated by remote control, or by combination thereof.

The invention also provides retractable means for the exhaust deflecting members or blades to withdraw the blades out of the path of the exhaust stream to prevent excessive heating, the blades being projectable into the exhaust stream to control movement of the vehicle. In one form of the invention, the deflection members are radially movable into and out of the exhaust stream and pivotal to control the effect on movement of the vehicle. The blades will be rendered operative only when a change of movement is desired. The blades may again be actuated manually, hydraulically or electrically and remotely, if desired, or any combination thereof.

Further features and advantages of the invention will readily be apparent from the following specification and from the drawings, in which:

FIGURE 1 is in elevation, partially in section, of a vehicle embodying the invention;

FIGURE 2 is a diagrammatic view of the deflection blade assembly showing it in exploded form;

FIGURE 2a is a diagrammatic view showing the blades assembled;

FIGURE 3 is a diagrammatic view of an operating mechanism for the blades of FIGURES 1 and 2;

FIGURE 4 is a further diagrammatic view of the operating mechanism;

FIGURE 5 is a still further diagrammatic view of a portion of the operating mechanism;

FIGURE 9 is a fragmentary perspective view of an operating mechanism for the embodiment of FIGURE 6;

FIGURE 10 is a longitudinal section through the operating mechanism of FIGURE 9;

FIGURE 11 is a fragmentary view of a modified mechanical linkage;

FIGURE 12 is a fragmentary perspective view illustrating the relation of the operating mechanism and a deflection blade of FIGURE 6;

FIGURE 13 is a fragmentary view, partially in section, of a further modification of the invention;

FIGURE 14 is an end elevation of FIGURE 13 taken generally along the line A—A thereof;

FIGURE 15 is a diagrammatic illustration of the operating mechanism of the embodiment of FIGURE 13;

FIGURE 16 is a further detail of the operating mechanism of the embodiment of FIGURE 13; and FIGURE 16a is a fragmentary side view of FIGURE 16 showing the operating mechanism of the embodiment of FIGURE 13.

Figure 6:
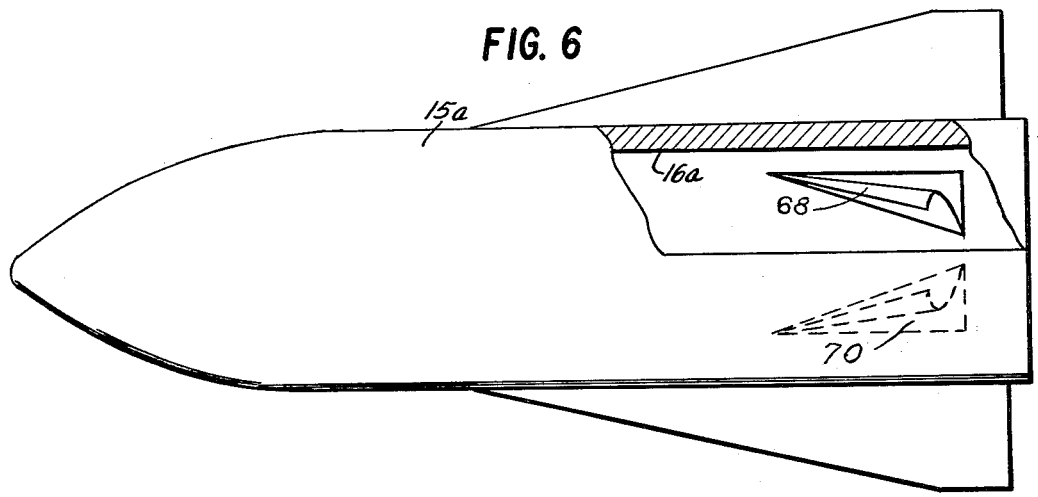
FIGURE 6 is an elevation, partially in section, of a modified form of the invention.

A craft 15 is illustrated in FIGURE 1, having rotatable deflecting blades 20, 24 and 26 mounted in the rear portion of an exhaust tube 16 having generally straight walls and of circular cross section. Deflection blade 20 which is shown in a vertical plane, is carried by a rotatable shaft 58, while blades 24 and 26, in a generally horizontal plane, are mounted on independently rotatable shafts 24a and 26a, respectively.

The craft may be caused to revolve by tilting blades 24 and 26 in opposite directions, and the direction of rotation may be reversed by reversing the direction of blade tilt. The craft may be caused to tilt up or down in a plane perpendicular to the axes of blades 24 and 26, by tilting the blades 24 and 26 simultaneously in one direction or the other. A turning movement of the craft may be effected by turning blade 20.

Details of an operating mechanism for blades 20, 24 and 26 are shown in FIGURES 3, 4 and 5. Fixed to the outer ends of shafts 24a and 26a are cross arm members 28 and 30, respectively. A pair of links 64 and 66 join the outer ends of cross arm 28 with the outer arms of cross arm 40 secured to an end of shaft 44. A pair of links 36 and 38 join the outer ends of cross arm 30 with cross arm 42 secured to an end of shaft 46. The opposite ends of shafts 44 and 46 have affixed thereto bevel gears 48 and 50, joined by a bevel driving gear 52, to which is secured a control shaft 54. Rotation of control shaft 54 causes opposite rotation of driven gears 48 and 50, acting through the respective linkages to tilt blades 24 and 26 in opposite directions causing rotation of the craft. Movement of drive shaft 54 in a plane perpendicular to the axes of shafts 44 and 46 moves drive gears 48 and 50 in the same direction, tilting blades 24 and 26 in the same direction causing the craft to tilt up or down. Vertical blade 20 is driven by linkages 60 and 62 connected to outer ends of cross member 63 secured to mounting shaft 58.

Figure 7:
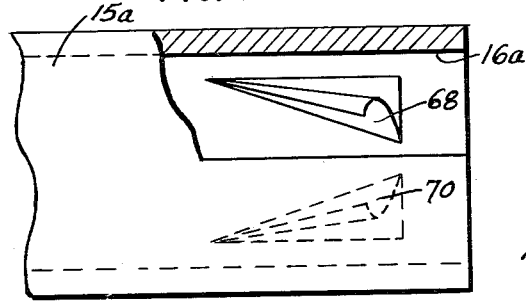
FIGURE 7 is a fragmentary detailed view of FIGURE 6.
Figure 7A:
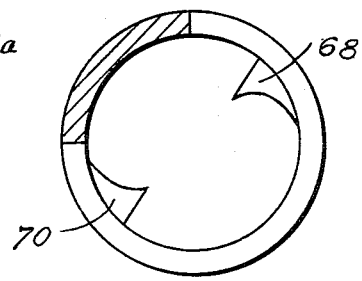
FIGURE 7a is an end view of FIGURE 7, looking from the right thereof.
Figure 8:
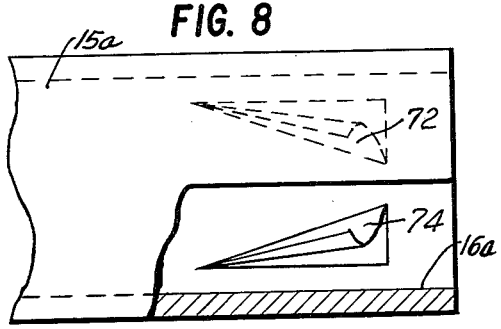
FIGURE 8 is a further fragmentary detailed view of FIGURE 6.
Figure 8A:
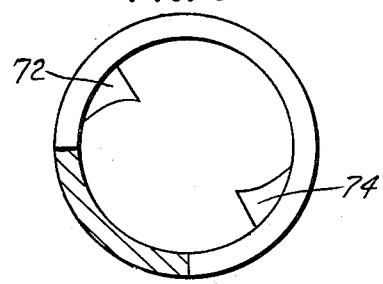
FIGURE 8a is an end view of FIGURE 8 looking from the right thereof.

In FIGURE 6 a modified form of the invention is shown with the craft 15a having an exhaust tube 16a. Four deflecting surfaces or segments 68, 70, 72 and 74 are provided adjacent the rear of the exhaust tube. These deflection surfaces preferably comprise generally triangular sections of the wall of the exhaust tube. Each triangular wall section, if laid flat, is a right triangle with a first leg extending longitudinally of the craft and parallel with the axis of the exhaust tube and the other leg extending around the inner surface of the tube in a plane at right angles to the axis. Each deflecting surface is hinged with the remainder of the wall of the exhaust tube along the hypotenuse of the triangle and the surfaces rotate about this edge, which extends generally longitudinally of the tube and makes an acute angle with a line parallel to the tube axis. The deflecting surfaces are movable from a first position in which they are flush with the remainder of the tube wall, into the exhaust stream to perform a deflecting action. In straight flight of the craft, the four deflecting surfaces are preferably maintained in this first position flush with the exhaust tube walls and there is no hindrance of the exhaust stream. The deflecting segments may be held in such position by suitable spring means (not shown). The four segments may be selectively moved away from the position in which they are flush with the exhaust tube wall, into the exhaust stream to effect the desired modification of the flight path of the vehicle. For example, when deflecting surfaces 68 and 70 are actuated as shown in FIGURES 7 and 7a, the craft rotates in one direction while actuation of the opposite pair of surfaces 72 and 74 causes rotation in the opposite direction. Actuation of surfaces 68 and 74 causes the craft to turn in one direction while actuation of surfaces 70 and 72 causes a turn in the opposite direction. The speed of the revolution or direction change is governed by the degree to which the surfaces are moved into the exhaust stream away from their positions flush with the exhaust tube wall.

A mechanical cam arrangement for actuating the deflection segments 68, 70, 72 and 74 is shown in FIGURES 9, 10 and 12. A series of three concentric operating shafts 71, 73 and 75 are provided at one end with operating levers 76, 78 and 80, lever 76 being connected to the shaft 71, lever 78 being connected with shaft 73 and lever 80 being connected with shaft 75. Extending outwardly from shaft 71 is a cam extension 77 with a cam roller 77a thereon. A similar cam extension 79 extends outwardly from shaft 73 and carries cam roller 79a. A pair of oppositely disposed extensions 81 and 83 extend outwardly from operating shaft 75 and carry cam rollers 81a and 83a, respectively. Operably associated with the cam extension rollers are four connecting shafts, one for each deflection surface (only three, designated 84, 85 and 86, being shown in FIGURE 9). Extensions as 84a, 85a, 86a and 86b on shafts 84, 85 and 86 are engageable by appropriate cam rollers to the control shafts. Connected to the opposite end of each shaft, as illustrated in FIGURE 12, is a cam extension 85c with the cam roller 85c' engageable with deflection segment 72. It will be understood that similar connections are provided between the other operating shaft and the other deflection segments. Thus, rotation of control shaft 85 is a counterclockwise direction as viewed from the left in FIGURE 9 causes actuation of deflection segment 72 into the path of the exhaust stream. The three levers illustrated in FIGURES 9 and 10 provide for certain types of movement of the deflection surfaces. For example, the proper operation of lever 76 in conjunction with either 78 or 80 may act to effect a combination of rotation and directional change. Furthermore, the movement of lever 76 to the right may actuate deflection segments 68 and 70, while movement to the left may actuate segments 72 and 74, to effect rotation of the vehicle.

FIGURE 11 illustrates a modified form of the interconnection between rotating control shaft 85 and a deflection surface or segment 72. In this embodiment of the invention the end of shaft 85 is formed with a worm gear which meshes the teeth of a gear segment 87. Rotation of shaft 85 effects the desired movement of the deflection surface. Other suitable hydraulic, electrical or manual control means will readily be apparent to those skilled in the art.

A further embodiment of the invention is illustrated in FIGURES 13 through 16. In FIGURE 13 there is shown a craft 15b having an exhaust tube 16b through which an exhaust stream is discharged from the engine. The deflecting surfaces of this embodiment comprise movable sections of the exhaust tube wall, identified by the reference numerals 90, 92, 94 and 96. These segments are movable inwardly and outwardly of the exhaust tube along radial paths and are rotatable, when in the inwardly extended position, about a centrally located shaft. In FIGURE 14, the deflection segments 90 and 96 are shown extended inwardly of the exhaust tube surface, and deflection segments 92 and 94 are shown retracted and received in wells in the exhaust tube wall, the inner surfaces of these latter two sections being flush with the tube wall.

Each of the deflection segments has an operating shaft, 90a, 92a, 94a and 96a extending outwardly into the vehicle wall. As best seen in FIGURE 16, the operating shaft 90a of deflection segment 90 is formed with annular teeth engaged by a gear 100, driven from a sprocket 98 through a suitable cable or chain 99. Rotation of the gear 100 causes movement of deflection segment 90 along the axis of shaft 90a. An extension 90b of shaft 90a is slidably received within and splined with a connector 104 to which a cross arm 105 is fixed. Links 106 and 107 secured to the ends of cross arms 105 are connected with an actuator to effect rotation of member 104 and of deflection member 90 in a manner similar to that shown in FIGURES 3 and 4. Corresponding connections are, of course, made to the other deflection members.

FIGURE 15 illustrates mechanical arrangement for simultaneously extending and retracting a pair of opposed deflecting surfaces 90 and 96. The gear and sprocket arrangement (100—98) is duplicated for each of the deflection members; and the drive members 99 are connected through suitable driving cables or chains 101 to meshed gears 110 which assure synchronous operation of the deflecting surfaces.

I claim:

1. In a space vehicle powered by an engine having an exhaust stream, guidance means of the character described, including: an exhaust tube of annular cross section through which said exhaust stream is discharged, said tube having an inner wall; at least one generally triangular exhaust deflecting member hinged to said tube wall and having a first position flush with the inner surface of said tube wall, said deflecting member having generally the shape of a right triangle with one leg parallel with the axis of said tube and the other leg in a plane at right angles thereto, said deflecting member being hinged to the tube wall along the hypotenuse of the right triangle; and means for moving said deflecting member into the exhaust stream to control movement of the vehicle.

2. In a space vehicle powered by an engine having an exhaust stream, guidance means of the character described, including: an exhaust tube of annular cross section through which said exhaust stream is discharged, said tube having an inner wall; four generally triangular exhaust deflecting members hinged to said tube wall and arranged in diametrically opposed pairs, each member having generally the shape of a right triangle, the deflecting members in each pair having one leg parallel with the axis of said tube and adjacent each other, and the other leg lying in the same plane and at right angles to the axis of said tube, and pivoted to the tube wall along the hypotenuse of the member; and means for moving said deflecting member into the exhaust stream to control movement of the vehicle.

3. The guidance means of claim 2 wherein each of said control members has the leg parallel with the tube axis longer than the leg lying in a plane at right angles thereto.

4. In a space vehicle powered by an engine having an exhaust stream, guidance means of the character described, including: an exhaust tube of annular cross section through which said exhaust stream is discharged, said tube having an inner wall; four generally triangular exhaust deflecting members hinged to said tube wall and arranged in diametrically opposed pairs, each member having generally the shape of a right triangle, the deflecting members in each pair having one leg parallel with the axis of said tube and adjacent each other, the other leg lying in the same plane and at right angles to the axis of said tube, and pivoted to the tube wall along the hypotenuse of the member; and means for selectively moving desired control members into the exhaust stream to control movement of the vehicle.

5. The guidance means of claim 4 wherein said last-mentioned means comprises a plurality of selectively movable controls for moving predetermined control members to effect desired maneuvers of the vehicle.

References Cited in the file of this patent

UNITED STATES PATENTS

| 1,879,187 | Goddard | Sept. 27, 1932 |
| 2,841,956 | Gunson et al. | July 8, 1958 |
| 2,857,119 | Morguloff | Oct. 21, 1958 |

FOREIGN PATENTS

| 1,164,936 | France | May 19, 1958 |

OTHER REFERENCES

SAE Journal, January 1958, pages 64, 65.